Sept. 4, 1923.　　　　　　　　　H. C. LAFFERTY　　　　　　　　　1,467,276
LINE FASTENER
Filed Oct. 6, 1921　　　　　2 Sheets-Sheet 1
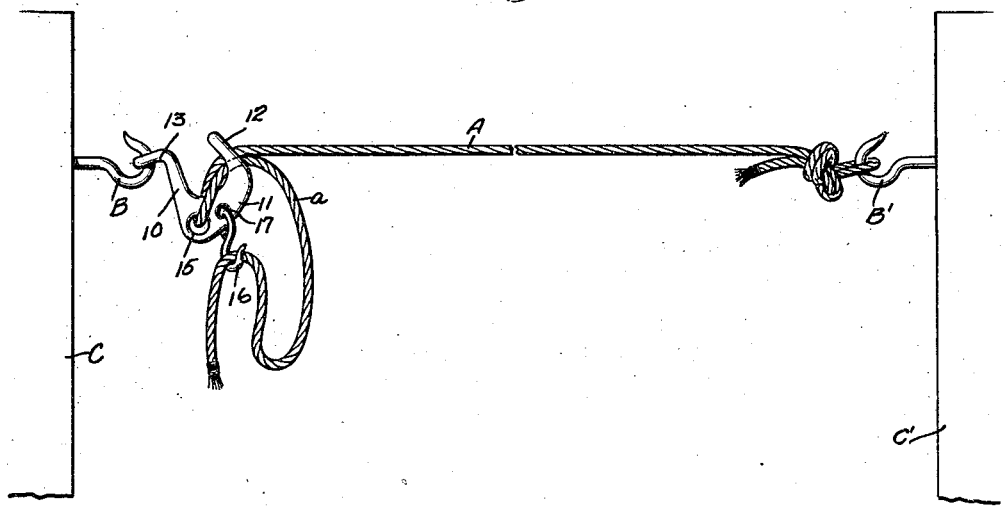
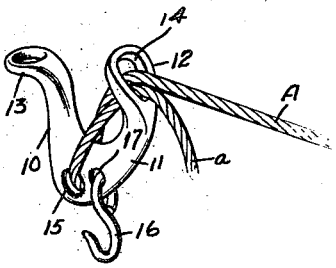
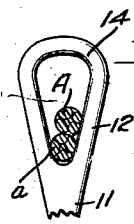
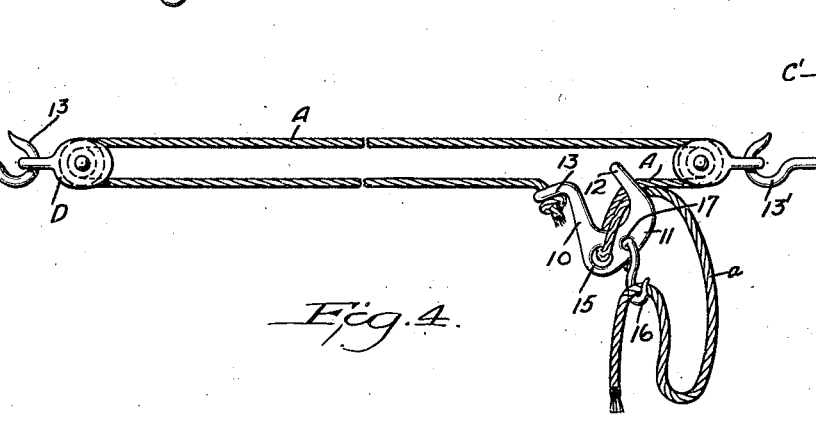
WITNESSES
INVENTOR
HARRY CRAWFORD LAFFERTY
BY
ATTORNEYS Sept. 4, 1923. 1,467,276
H. C. LAFFERTY
LINE FASTENER
Filed Oct. 6, 1921 2 Sheets-Sheet 2
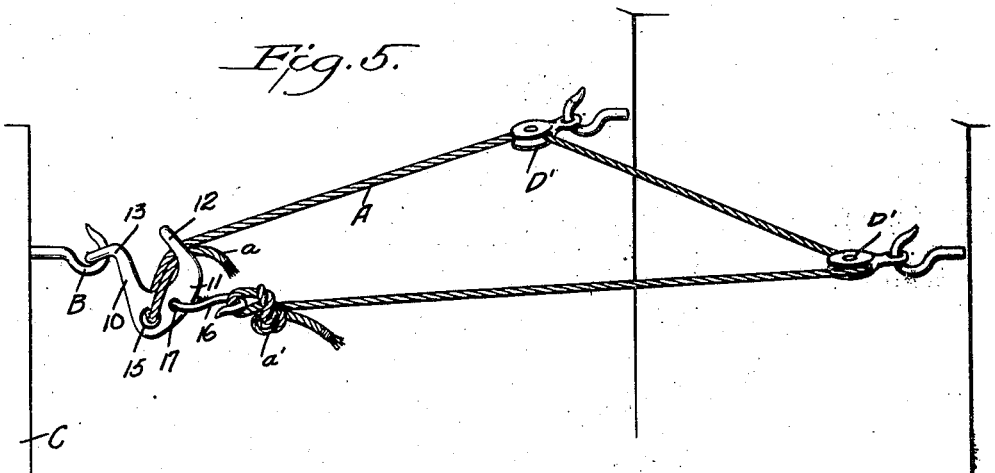
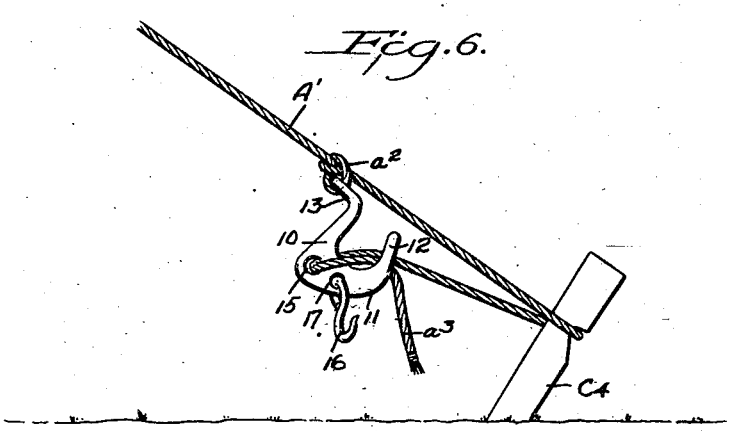
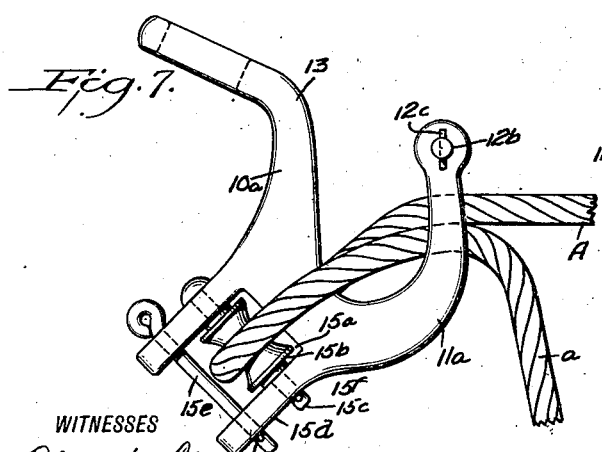
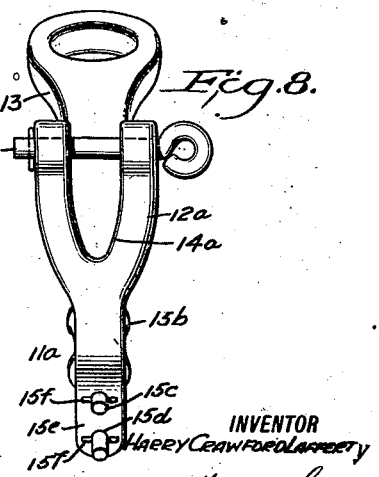
WITNESSES
INVENTOR
Harry Crawford Lafferty
BY
ATTORNEYS Patented Sept. 4, 1923.

1,467,276

UNITED STATES PATENT OFFICE.

HARRY CRAWFORD LAFFERTY, OF NEW CASTLE, PENNSYLVANIA.

LINE FASTENER.

Application filed October 6, 1921. Serial No. 505,860.

*To all whom it may concern:*

Be it known that I, HARRY CRAWFORD LAFFERTY, a citizen of the United States, and a resident of New Castle, in the county of Lawrence and State of Pennsylvania, have invented a new and Improved Line Fastener, of which the following is a description.

My invention relates to means to fasten a clothes line, guy rope, or the like, and more particularly relates to a fastening device of hook form having novel means for suspending it in position and for so engaging the rope as to hold it fast but permitting of the rope being readily loosened with the greatest facility when desired.

A further object of the invention is to provide a line fastener that may be adapted to be either hung on a fixed hook and having provision for fastening either one or both ends of a line, or adapted to be employed as a connection between the terminals of a rope to run as an endless rope or adapted to be hung on a guy rope, for example, and employed as a hitch or come-along.

The nature of the invention and its distinctive features and advantages will clearly appear as the description proceeds.

Reference is to be had to the accompanying drawings forming a part of this specification, it being understood that the drawings are merely illustrative of one example of the invention.

Figure 1 is a side elevation of a line fastener formed in accordance with my invention, showing the same in use holding one end of a clothes line or the like;

Figure 2 is a perspective view of the fastening device indicating the manner of gripping an end of the line;

Figure 3 shows a front view of the bill of the hook-like fastener;

Figure 4 is a side elevation of a fastener employed for securing the terminals of a line for the latter to run as an endless line;

Figure 5 is a perspective view showing the fastener employed on a three-sided clothes line, or the like;

Figure 6 is a side elevation of the fastener employed as a hitch or a come-along on a guy rope or tent rope;

Figure 7 is a side elevation of the fastener in modified form to embody means for conveniently placing and removing the line;

Figure 8 is a front view of the device shown in Figure 7.

Referring at first more particularly to the line fastener of the form shown in Figures 1 to 6, said fastener is in the form of a hook-like device having a shank 10 and an upturned forwardly disposed bill 11; the terminal 12 of which is deflected rearwardly to be disposed in a plane approximately parallel with the shank 10. The shank terminates at its upper end in a rearwardly offset eye 13 at a distinct angle to the general plane of the shank. Said eye 13 is adapted to engage a fixed hook B on a wall C, for example, as shown in Figures 1 and 5. Or, said eye may receive one end of a line A having a terminal knot to prevent withdrawal of the line from the eye as shown in Figure 4 in utilizing the device to connect the two ends of the line; or the eye 13 may be suspended on a tent rope or the like indicated at A', Figure 6.

The bill 12 of the device is formed with an opening 14 in a manner that the material of the device extends entirely about the opening so that the latter is closed at all sides. The opening 14 is convergent toward the lower end for gripping the line. To coact with the opening 14 a transverse hole 15 is formed in the device adjacent to the juncture of the shank 10 and the bill 11. The terminal 12, it will be observed, is deflected to an extent to overhang rearwardly in the plane of the hole 15.

The arrangement is such that when the rope A is passed through the opening 14 from the front of the device and carried downwardly and through the transverse hole 15 and the free end *a* returned forwardly through the opening 14, beneath the main run of the rope A, the bend or bight of the line between the opening 14 and the hole 15 will be at such a pronounced angle to the main run and to the tension on the line A as to cause the returned end *a* to be firmly wedged into the convergent end of the opening 14 by the main run of the line due to the tautening of the line.

I provide a hook 16 fastened to the shank 11 at a transverse hole 17 therein forward of the hole 15, said hook 16 being adapted to be freely suspended for swinging movement to assume various angular positions relative to the shank 11. Said hook, when the line fastener is employed for securing one end only of a line as in Figure 1, may have the returned end hung thereon, when returned forwardly through the eye 14. The hook 16 is of special utility in use on a three-sided or four-sided clothes line for example as in Figure 5 in which case the eye 13 is hung on the hook B as in the arrangement of Figure 1 and the line A is carried through pulleys D, D' on out-posts and returned to the hook 16, one end being tied to said hook 16 while the other is fastened by means of the opening 14 and hole 15 as described.

In the form shown in Figures 7 and 8 a closed opening 14$^a$ is formed convergent toward the lower end as in the first case. The complete closure of the eye is effected, however, by making the upper end 12$^a$ of the bill 11$^a$ of the device in the form of a fork and employing a transverse pin 12$^b$ across the ends of the fork, said pin being fastened by a cotter pin 12$^c$. Similarly, a closed transverse hole 15$^a$ is provided in which is set a grooved roller or sheave 15$^b$ about which the line is bent, said line being passed as described rearwardly through the opening 14$^a$ and returned forwardly therethrough. The grooved roller 15$^b$ turns on a pin 15$^c$ which passes through the sides 15$^d$ of the hole 15$^a$, said sides receiving also a transverse pin 15$^e$ to complete the closure of the hole. The pins 12$^b$ and 15$^e$ are readily removable for the placing or removal of a line A, this form of the device being especially serviceable in the case of a thick line. Cotter pins 15$^f$ secure the pins 15$^c$, 15$^e$.

For taking up slack in the rope A or paying out the returned end $a$ thereof it is only necessary to tilt the line fastener to bring the opening 14 and hole 15 at a less angle to the line of tension. By reason of the opening 14 being surrounded on all sides by the material of the hook bill 11 and its terminal 12 and the transverse hole 15 similarly being entirely surrounded by material of the fastener, the rope is positively held against displacement but may be caused to run with facility when desired by properly disposing the fastener relatively to the line of tension.

The plane and height of the terminal 12 and its opening 14 relatively to the offset eye 13 of shank 10 causes the tension of the line to exert an upward pull on the fastener causing it to rock vertically about the hook B or other support for said eye 13 so that an effective binding and gripping action of the main rope A of the returned end $a$ results.

In the arrangement of Figure 6 the fastener is secured to rope A' which may be assumed to be a tent rope bent about an anchor pin C$^4$, the eye 13 being tied by any simple knot A$^2$ to be suspended on the line distant from the anchor pin. The rope is then made fast by running it through the opening 14 and hole 15 as previously described.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claims.

Having thus described my invention, I claim:

1. A line fastener of hook-like form, the shank thereof having a rearwardly offset eye at its upper end, and a forwardly extending bill at the front of the shank, said fastener having an opening at the end of the bill and having a transverse hole at the base of the bill through which a line may be run and returned.

2. A line fastener of hook-like form, the terminal of the bill thereof having an opening closed at all sides through which the line may be passed and returned, said fastener having a transverse hole adjacent to the base of the shank through which the bight of the line may be passed.

3. A line fastener of hook-like form, the bill thereof having an opening near the end closed at all sides through which the line may be passed and returned, said fastener having a transverse hole adjacent the base of the shank with which the bight of the line my be engaged when said line is passed through said opening and returned.

4. A line fastener of hook-like form, the shank thereof having a rearward offset at its upper end, said offset having a vertical eye, the bill of the fastener extending upwardly and said bill having an opening at its upper end, said upper end being deflected rearwardly and extending to approximately the plane of said offset, said fastener having a transverse hole adjacent to the base of the bill for engaging the bight of the line when the latter is passed through said opening of the bill and returned.

5. A line fastener of hook-like form, the shank thereof having means at its upper end whereby to suspend the fastener, the bill of the fastener and said fastener adjacent to the base of the bill having coacting means for engaging the line; together with a hook suspended from the line fastener adjacent to the base of the bill.

HARRY CRAWFORD LAFFERTY.